United States Patent

[11] 3,603,675

[72] Inventor Charles Woodruff, deceased
late of New York, N.Y. (by Ethel Woodruff, executrix)
[21] Appl. No. 846,997
[22] Filed July 28, 1969
[45] Patented Sept. 7, 1971
[73] Assignee Visual Instruction Systems Inc.
New York, N.Y.

[54] MOTION PICTURE FILM REPRODUCING APPARATUS AND METHOD WITH PROVISION FOR TRANSLATION OF STOP-MOTION CODING
9 Claims, 1 Drawing Fig.
[52] U.S. Cl. .................................................. 352/56, 355/40, 352/92
[51] Int. Cl. ...................................................... G03b 21/52, G03b 27/52
[50] Field of Search ............................................ 352/56, 92, 130, 169, 236; 355/4 D

[56] References Cited
UNITED STATES PATENTS
2,139,214 12/1938 Wahl............................ 352/56 X
2,269,952 1/1942 Morgan........................ 352/92
3,263,555 8/1966 Scheib.......................... 352/92 X
3,301,628 1/1967 Hellmund..................... 352/92 X
3,374,723 3/1968 Baumbach.................... 352/236 X Primary Examiner—S. Clement Swisher
Attorney—Hubbell, Cohen & Stiefel ABSTRACT: A copy of a motion picture film is prepared and provided with stop-motion coding in the form of a strip along the sprocket edge which includes emulsion-free segments. To accomplish this, an auxiliary light source is focused on the sprocket edge, and a shutter is moved into and out of blocking position to produce alternate emulsion-free and emulsion-covered segments along that edge. The shutter is operated by a solenoid under control of a relay. When the copy film is reproduced from a master film having stop-motion indicia in the form of successive notches indicating the start and finish respectively of a stop-motion segment, the relay embodies a push-push type of movement and is under the control of a microswitch which senses the notches and pulses the relay at the start and finish.

PATENTED SEP 7 1971
3,603,675
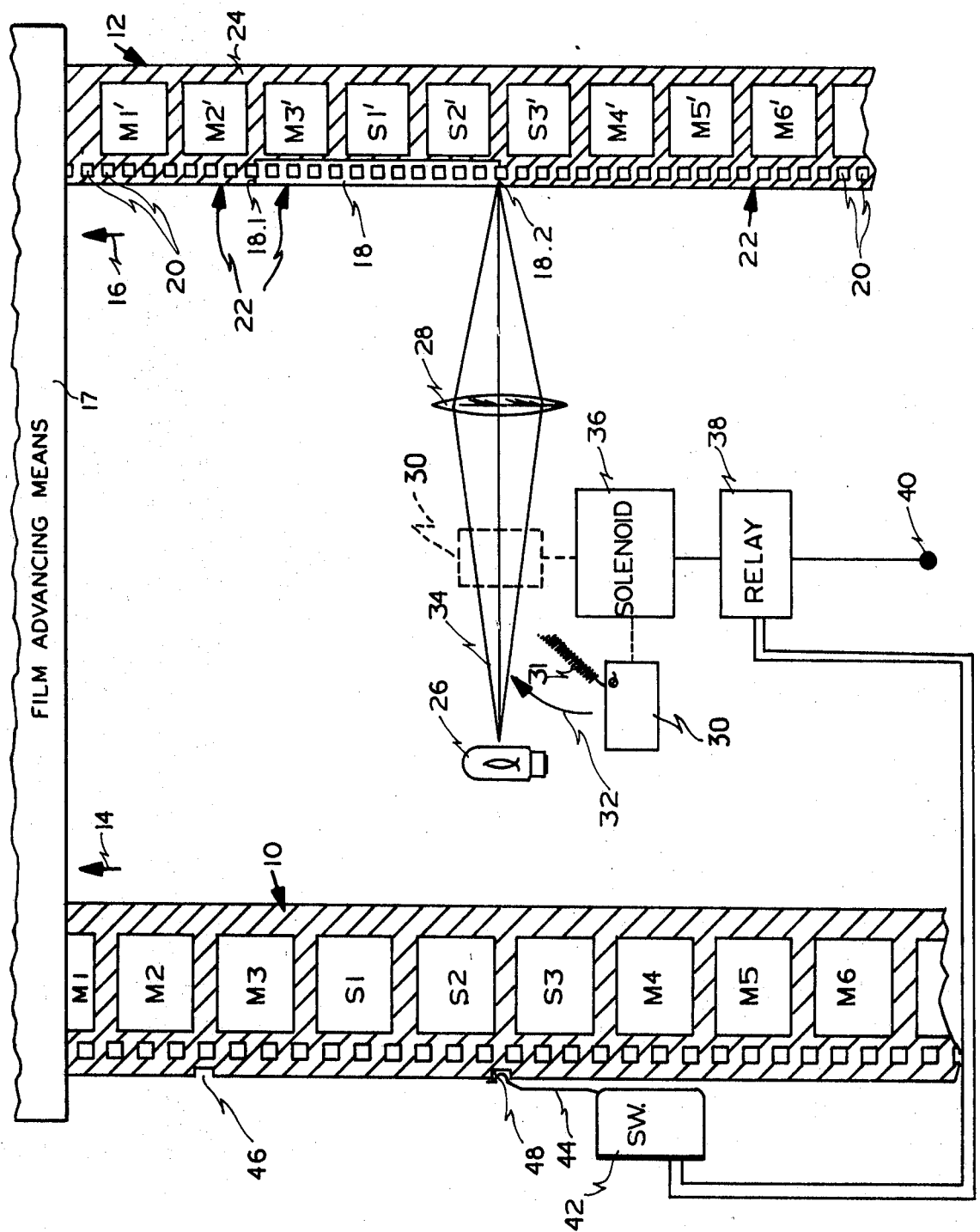
INVENTOR.
CHARLES WOODRUFF
BY
ATTORNEYS.

MOTION PICTURE FILM REPRODUCING APPARATUS AND METHOD WITH PROVISION FOR TRANSLATION OF STOP-MOTION CODING

FIELD OF THE INVENTION

This invention relates generally to motion picture equipment; and is particularly concerned with apparatus for copying a master motion picture film having one form of stop-motion indicia, and converting it to another form on a copy film.

THE PRIOR ART

A known form of audiovisual instruction system displays a motion picture film, usually of 8 millimeter size, by means of a projector having a drive motor connected through an electrically disengageable clutch to a film-advancing mechanism. The sound track for the audiovisual presentation is synchronized with the motion picture film, but recorded on a separate magnetic tape, and the system is integrated in such a way that the motion picture film and the magnetic tape recording cooperate to achieve single-frame film advance when required.

Single frame operation is initiated by stop-motion coding in the form of a longitudinal strip on the sprocket edge of the motion picture film which is divided into alternate emulsion-covered and emulsion-free segments. An emulsion-free segment of the code strip indicates that film frames associated therewith are to be projected in the single-frame mode. An optical system incorporated in the film projector detects the presence of such an emulsion-free segment, and triggers an electrical device which disengages the projector clutch and stops the film at the desired frame.

Since the motion picture film is now stopped, there is no way that coding information which appears at a subsequent location on the film strip can be read and used by the projector for the purpose of restarting the film. Therefore this function is relegated to the magnetic tape upon which the sound track is recorded, because that tape continues to move and reproduce the audio portion of the presentation even during single frame operation of the film projector. An appropriate signal, which does not interfere with the sound track, is recorded upon the magnetic tape and sensed by the audio playback device, which sends a signal to reengage the projector clutch, restarting the motion picture film.

As long as an emulsion-free stop-motion coding segment is sensed by the optical system, the projector will go right back into the single-frame mode with each succeeding film frame. It then advances the film on a frame-by-frame basis, each successive frame being released in response to the audio tape. Finally, when the next advance of the motion picture film brings the end of the emulsion-free stop-motion coding segment past the optical sensing device, the projector thereafter remains in the normal motion mode, displaying the film at a conventional rate such as 16 frames per second, until the next emulsion-free stop-motion-coding segment appears.

Eight millimeter motion picture films of this type are sometimes prepared by optical copying, with appropriate size reduction, from a 16 mm. master film which has a stop-motion and conventional motion pictorial frames printed thereon, together with appropriate indicia for distinguishing the two. Since it is the usual practice in the industry for a master film to be used only for printing copies and never for ordinary projection, the stop-motion indicia on the master film may be in a form which would not be suitable for ordinary projection, e.g. notches cut into the sprocket edge of the master film. One such notch indicates the beginning of a stop-motion segment, and a following notch indicates the end of such a segment.

During copying of the master film some technique must be employed for translating the notch type stop-motion indicia on the master film into coding in the form of alternate emulsion-free and emulsion-covered edge segments. In the past this has been done by mechanically scraping the photographic emulsion from the sprocket edge of the copy film in those areas where stop-motion coding is required. This is an undesireable practice, time consuming if performed by hand, difficult to accomplish by means of automatic machinery, and dangerous in the sense that the scraping tool consuming accidentally scrape off some of the content of the copy film or catch one of the sprocket holes and tear the film.

THE INVENTION

The present invention avoids these pitfalls by the elegantly simple expedient of optically printing the stop-motion coding on the edge of the copy film. Subsequently, during conventional development of the copy film, the emulsion is removed from the exposed areas by the usual chemical means, leaving the sprocket edge of the film with the desired pattern of alternate emulsion-free stop-motion-coded and emulsion-covered noncoded areas.

BRIEF DESCRIPTION OF THE DRAWINGS

The single FIG. of the drawing is a schematic representation of a 16 mm. master film and an 8 mm. copy film as they pass through a conventional film copier device (not illustrated); together with mechanism in accordance with this invention for optically translating stop-motion indicia, in the form of notches in the master film, to emulsion free stop-motion coding segments along the sprocket edge of the copy film.

DETAILED DESCRIPTION OF THE PREFERRED EMBODIMENT

This invention is practiced in conjunction with a film copier device of a type which is conventional and in the main need not be illustrated. The copier simultaneously advances a 16 mm. master film 10 and an 8 mm. copy film 12 in the direction indicated by arrows 14 and 16 by means of a drive mechanism 17. As the two films pass through a copier, a conventional projection lamp and optical projector system incorporated in the copier prints a frame-by-frame copy of the 16 mm. master film 10 upon the 8 mm. copy film 12, with appropriate optical size reduction. Specifically, in the illustrated example a typical segment of the 16 mm. master film comprises consecutive ordinary motion frames M1, M2 and M3, stop-motion frames S1, S2 and S3, and additionally ordinary motion frames M4, M5 and M6 which are reduced in size but otherwise identically reproduced upon the copy film 12 as ordinary motion frames M1', M2' and M3', stop-motion frames S1', S2' and S3', and additional ordinary motion frames M4', M5' and M6' respectively.

The copy film 12 is intended to be displayed to an audience in such manner that frames through M3' are shown in a continuing motion mode, i.e. displayed at 16 frames per second or any other free-running projection speed, after which the stop motion frames S1', S2' and S3' are shown one by one. After each of the stop-motion frames has been this displayed, the next segment of the film starting with M4' is once again displayed in the ordinary motion mode. In order to control the switchover from motion mode to stop-frame and back again, a known form of stop-motion coding comprising an emulsion-free segment 18 appears along the same edge of the copy film 12 near which the sprocket holes 20 appear. It will be appreciated that all other portions of a longitudinal strip 22, which runs along the sprocket-bearing edge of the film, are covered by a conventional coating or photographic emulsion 24, except for particular areas from which the emulsion is removed for stop-motion coding, as in the case of segment 18 of the longitudinal strip 22.

In the past, in order to create such an emulsion-free island 18 on edge strip 22, the industry employed a sharp tool for mechanically scraping off the emulsion 24. According to the present invention, however, the same result is achieved in a far simpler and safer manner by employing an auxiliary lamp 26 and an appropriate optical system (schematically represented by a single lens 28) to expose the desired stop-motion coding area 18 so that subsequent chemical development thereof will wash away the emulsion 24 from appropriate segments of the longitudinal strip 22 as well as from appropriate areas within the boundaries of pictorial frames M1' through M6' etc.

In order to start and stop the exposure at the required places along the length of the edge strip 22, there is provided a shutter 30 which normally rests in a disabling position indicated by the dashed line representation, but which can be swung into an exposing position indicated by the solid lines. The disabling position causes the shutter 30 to interrupt a light beam 34 which emanates from the auxiliary lamp 26, thus preventing exposure of the edge strip 22. On the other hand, movement of the shutter 30 into the exposing position, which is accomplished by a solenoid 36, permits the optical printing of a stop-motion coding region such as 18.

The 36 must be energized to move the shutter 30 into the exposing position and thus enable the stop-motion-coding exposure system. Such energization occurs under control of a relay 38 which connects solenoid 36 to power terminal 40. Relay 38 in turn is under the control of a microswitch 42 equipped with a feeler arm 44 for sensing the passage of stop-motion indicia notches 46 and 48 cut into the sprocket edge of the 16 mm. master film 10.

When a first stop motion notch 46 engages the switch feeler arm 44 during advance of the master film 10, a first closure of the microswitch 42 occurs and pulses the relay 38, causing the relay to energize the solenoid 36, and to keep it energized until the next actuation of the microswitch 42. During the interval of solenoid energization the shutter 30 occupies its solid line position, permitting the auxiliary lamp 26 and optical system 28 to expose the stop-action coding region 18 of the longitudinal edge strip 22.

The end of the region 18 is determined by sensing of the next stop-motion notch 48 of the master film 10 by the switch feeler arm 44. This results in a second actuation of the microswitch 42, and a second pulsing of the relay 38. This relay incorporates a push-push switch movement of the type which energizes solenoid 36 upon receiving one pulse from the switch 42, and thereafter keeps the solenoid energized until the next pulse is received from the switch 42, whereupon it deenergizes the solenoid. Deenergization of the solenoid 36 allows shutter 30 to return under the influence of a conventional biasing spring 31, moving in the direction of arrows 32 to its dashed line position.

When in the latter position, shutter 30 once again disables the optical stop-motion-coding system by blocking light beam 34. As a result, the following segment of edge strip 22 is not exposed, and retains its photographic emulsion 24 upon subsequent chemical development.

It should be clearly understood that the master film 10 and copy film 12 are both advanced continuously in the direction indicated by arrows 14 and 16 during the entire time that the optical copying and size reduction process is in progress. The mere fact that some of the frames being copied are intended for display in the single-frame mode during projection for the benefit of an audience does not require the films to be stopped during copying. Thus the copying process simply proceeds from start to finish without interruption, regardless of the content of the audiovisual presentation being copied. As a result, the stop-motion-indicating notches such as 46 and 48 on the master film 10 are presented in an on going sequence to the switch feeler arm 44. Each time a first stop-motion notch such as 46 is detected, the switch 42, relay 38 and solenoid 36 cause the shutter 30 to enable the optical stop-motion code-printing apparatus 26, 28; and the next succeeding stop-motion notch such as 48 disables it and terminates the printing of a stop-motion code segment in the manner described. Later on, when the copy film 12 is displayed for the benefit of an audience as part of an audiovisual educational presentation, frames through M3' are displayed in the ordinary motion mode, frames S1' through S3' are displayed in the stop-motion mode, due to the presence of the code area 18 of a particular length and in a particular location relative to frames S1' through S3'.

The conventional synchronization spacing between stop-motion indicia such as 46, 48 and 18 and their associated frames S1 through S3 and S1' through S3' respectively is 1½ frames. Thus, the stop-motion starting notch 46 on the master film 10 appears 1½ frames in advance of its associated first stop-motion frame S1, and the stop-motion terminating notch 48 appears 1½ frames in advance of the first ordinary motion frame M4 which follows the last stop-motion frame S3 of that sequence. Similarly, a leading edge 18.1 of the stop-motion coding region 18 appears 1½ frames in advance of the associated first stop-motion frame S1 on copy film 12, while the trailing edge 18.2 of the stop-motion coding region appears 1½ frames in advance of the first ordinary motion frame M4' following the last stop-motion frame S3' in that particular segment of the copy film 12.

It will now be readily appreciated that the present invention provides an elegantly simple method and apparatus for optically translating stop-motion notch indicia into emulsion-free coding during the process of motion picture film reproduction and that the approach of this invention is distinctly safer and less troublesome than the prior art approach of mechanical emulsion-scraping. The stop-motion coding is printed in latent form by optical means, following which the conventional step of film development, which is required in any event to bring out the pictorial content of the film, is sufficient to remove the emulsion from the stop-motion code areas.

Since the foregoing description and drawings are merely illustrative, the scope of protection of the invention has been more broadly stated in the following claims; and these should be liberally interpreted so as to obtain the benefit of all equivalents to which the invention is fairly entitled.

What is claimed is:

1. In apparatus for reproducing master motion picture film having indicia thereon positioned in predetermined relation to the beginning and end respectively of a stop-motion segment on said master film, said apparatus including means for simultaneously advancing both said master film and a copy film and projecting the sequences of frames of said master film for reproduction upon said copy film; the improvement comprising:

strip-exposing means including a light source arranged for exposing a fixed point which traces a longitudinal strip on said copy film as said copy film advances;

means operable for selectively enabling and disabling said strip-exposing means whereby to obtain a selected sequence of alternate exposed and unexposed segments along the length of said longitudinal strip;

an electrically controlled actuator arranged to operate said enabling and disabling means between the enabling and disabling conditions thereof;

and means for controlling said actuator, including an electrical circuit for energizing said actuator, means for sensing said master film stop-motion indicia, and electrical switching means responsive to said sensing means for respectively opening and closing said energizing circuit upon the occurrence of successive indicia detection events.

2. Apparatus as in claim 1 wherein:

said strip-exposing means is arranged in relation to said frame projecting means so that the boundaries between said exposed and unexposed strip segments are located in predetermined relation to the reproduction son said copy film of respective frames of said stop-motion segment.

3. Apparatus as in claim 2 wherein:

said strip-exposing means is arranged to expose said strip at a location 1½ frames of said copy film in advance of the location at which said frame projecting means reproduces said master film frames.

4. Apparatus as in claim 1 wherein:

said enabling and disabling means is a shutter mechanism operable between respective positions for selectively blocking and unblocking the light from said strip-exposing source;

and said actuator is arranged to operate said shutter mechanism selectively between said blocking and unblocking positions.

5. Apparatus as in claim 4 wherein:
said actuator is a solenoid arranged to drive said shutter mechanism to one of said positions when energized.

6. Apparatus as in claim 5 wherein:
said solenoid is arranged to release said shutter mechanism when deenergized;
and said apparatus includes means for returning said shutter to the other position upon its release.

7. Apparatus as in claim 6 wherein:
said switching means comprises a relay connected to energize and deenergized said solenoid in response to said sensing means, 8. Apparatus as in claim 7 wherein:
said sensing means comprises means for detecting stop-motion indicia in the form of notches on said master film, and means connected to energize said relay in response to each notch-detecting event;
and said relay is of the type which energizes said shutter actuator solenoid when said relay is energized one time by said sensing means and deenergizes said shutter actuator solenoid when said relay is energized the following time by said sensing means, whereby one stop-motion indicating notch on said master film opens said shutter to begin exposing said longitudinal strip on said copy film and the following notch on said master film closes said shutter to stop exposing said longitudinal strip on said copy film.

9. A method of producing a motion picture copy film with stop-motion coding in the form of a longitudinal strip of alternate emulsion-covered areas and nonemulsion-covered areas, from a master film having a different form of stop-motion coding, comprising the steps of:
simultaneously advancing both said master film and said copy film while projecting the sequence of frames of said master film upon said copy film;
directing a light beam at a fixed point which traces the desired longitudinal strip on said copy film as said copy film is advanced, said point having a predetermined position relative to the location at which said frames are projected on said copy film;
detecting said stop-motion coding on said master;
controlling said light beam in accordance with said detected stop-motion coding of said master so that said copy film is exposed to said light beam from the time a first frame in a stop-motion segment is projected until the first frame following said stop-motion segment is projected, and only during that time;
and thereafter developing said copy film to remove the emulsion therefrom in the areas which were exposed to said light source.